3,394,549
STEP NOZZLE
Alois T. Sutor, Woodland Hills, Calif., assignor to North American Rockwell Corporation, a corporation of Delaware
Filed July 6, 1965, Ser. No. 469,617
1 Claim. (Cl. 60—271)

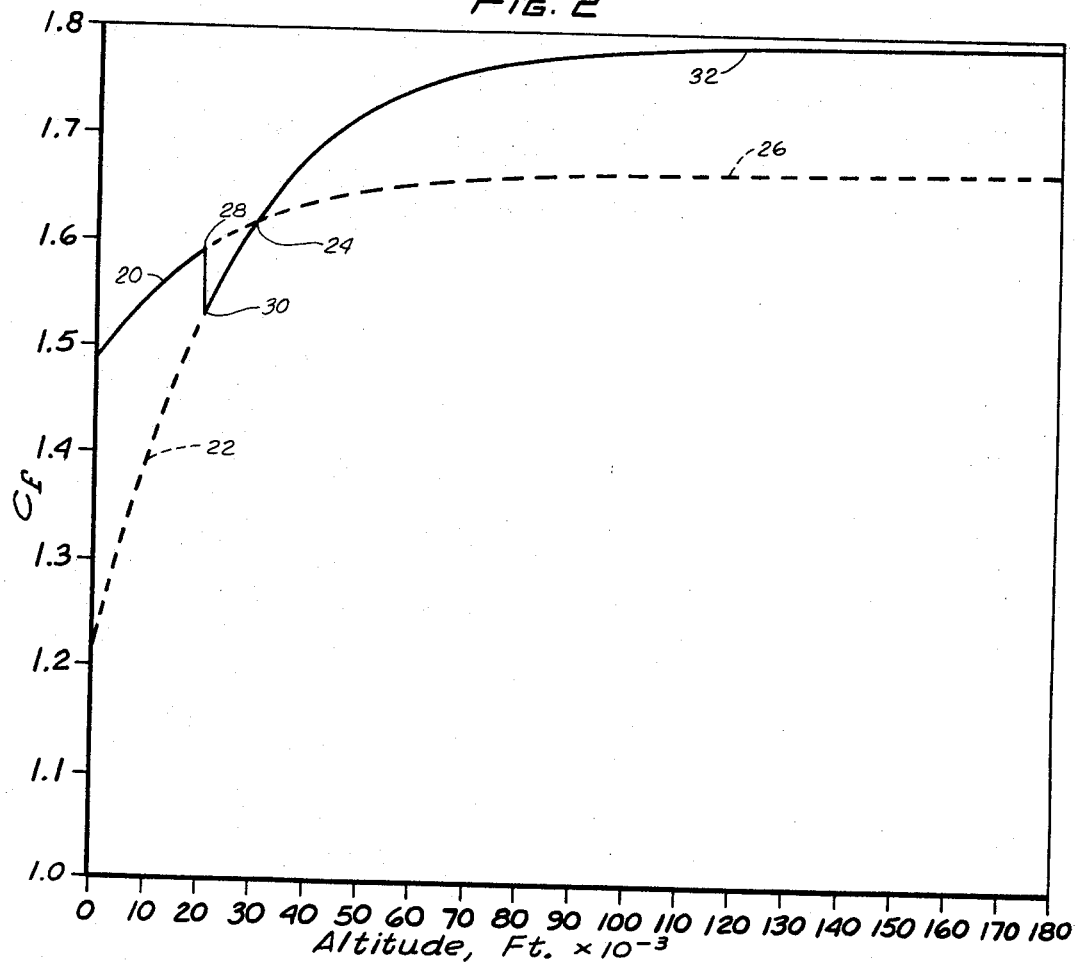
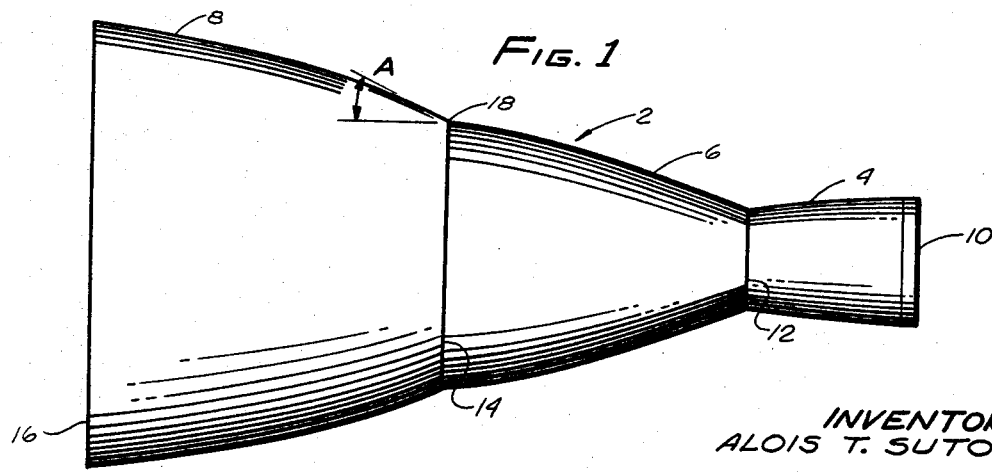

ABSTRACT OF THE DISCLOSURE

A rocket engine designed for optimum performance at lower and higher altitudes. The engine includes a first nozzle and a second larger nozzle that diverges from and makes an acute angle with the exit end of the first nozzle. Upon attaining a predetermined altitude, the jet of combustion particles flowing through the first nozzle expands outwardly against the walls of the second nozzle so that maximum high altitude thrust may be obtained.

---

This invention relates to rocket engines and other thrust producing devices.

More particularly, this invention relates to a rocket engine designed to compensate for pressure changes as different altitudes are reached during ascent of a missile or the like without the problems of side vector forces which are common with large area ratio engines.

The conventional rocket engine is provided with an injector, a combustion chamber, a throat area and a diverging nozzle portion. These engines are commonly referred to as having a bell or de Laval nozzle.

Thrust of a rocket engine utilizing a diverging nozzle is equal to the propellant mass flow rate exiting from the nozzle multiplied by the exit velocity, plus the exit area of the nozzle multiplied by the difference between the exiting gas pressure and the ambient pressure. This equation may be expressed as follows and in known as the fundamental thrust equation $$F = \dot{m} v_e + (P_e - P_a) A_e$$

where $F$ = thrust
$\dot{m}$ = propellant mass flow rate
$v_e$ = average velocity of the gas at the cross section of the nozzle exit
$P_e$ = exit pressure (average static pressure) measured against the nozzle exit
$P_a$ = ambient pressure in the atmosphere outside of the engine
$A_e$ = area of the exit plane of the nozzle Thus, it can be seen that the thrust of a given rocket engine is dependent upon the ambient pressure of the atmosphere which, in turn, is dependent on the altitude as which the engine is operating.

Another way of expressing this same relationship is by the following formula which is a derivation of the fundamental thrust equation.

$$F = P_c A_t C_f$$

where $F$ = thrust developed by the engine
$P_c$ = combustion chamber pressure
$A_t$ = the area of the throat of the engine
$C_f$ = the thrust coefficient The thrust coefficient value depends upon the extent of gas expansion in the nozzle, that is, expansion of the gases to the exit area, and also upon altitude.

If a nozzle is designed for operation at a given altitude above sea level, it can be said that the gases are over-expanded at sea level where the ambient pressure is greatest, and under-expanded at altitudes higher than the design altitude. For optimum performance at all altitudes, the ideal situation would be a constantly varying exit area with altitude.

To optimize performance over a wide range of altitudes, several approaches in the past have been suggested. One of these is described in a pending application, Ser. No. 401,428, filed on Oct. 5, 1964, and assigned to the assignee of this invention. In that application, a nozzle extension is deployed upon reaching a pre-determined altitude. Another approach is in providing a self-adjusting nozzle such as described in U.S. Patent No. 2,569,996.

When optimum performance is to be obtained from an engine throughout the total range of altitude encountered, it is desirable to provide as large an expansion area ratio as feasible. However, this results in problems at lower altitudes, and, more particularly, the problem of thrust vector variation. The action of gases in the nozzle as the engine reaches higher altitudes is to progressively expand within the nozzle as the ambient pressure decreases. However, this expansion can be more rapid on one side of the nozzle than on another side due to contour variations, however minute, combustion patterns and other phenomenon which results in a sidewardly directed vector. It is to obviate the problem of sidewardly directed vectors in large expansion area ratio engines, and to provide an efficient nozzle both at low altitudes (sea level) as well as at high altitudes (vacuum environment) to which this invention is directed.

There are disadvantages in providing self-adjusting (to ambient pressure) nozzles or deploying nozzle extensions for high altitude thrust. In the case of deployed extensions, additional complex members must be employed to motivate the nozzle. In a self-adjusting type of nozzle, control of the expansion is difficult. Accordingly, the typical prior art examples, in order to obtain the maximum thrust at high altitudes, construct the nozzle so that a high expansion ratio exists under all conditions. This type of nozzle, however, results in instability and performance loss problems as the engine passes from lower altitudes to high altitudes in that jet separation occurs within the nozzle as the ambient pressure decreases and expanding gases progressively approach the exit area. It is to obviate these disadvantages to which this invention is further directed.

In its more basic form, this invention comprises an engine including a combustion chamber and a diverging nozzle portion which has a more than one expansion area ratio. The gases expand in the first nozzle portion adjacent the combustion chamber. At low altitudes the gases attach to the exit plane of the first nozzle portion. At higher altitudes, a sudden flip or expansion of the gases occurs automatically between the first nozzle portion and the second nozzle portion. This obviates significant vectoring of the engine.

Accordingly, it is an object of this invention to provide an improved nozzle for a rocket engine and the like in which side vectoring due to expansion of gases through a varying altitude is obviated and the low altitude performance of the nozzle is increased without significantly affecting the thrust at vacuum emanating from the exit area of the nozzle.

Other and more particular objects and advantages of this invention will become apparent as this description proceeds taken in conjunction with the drawings in which:

FIG. 1 is a side view of a rocket engine employing the dual expansion ratio feature of this invention.

FIG. 2 is a graph of thrust co-efficient versus altitude for an engine embodying the feature of this invention compared with examples of two separate engines known in the art.

FIG. 1 is illustrative of a rocket engine embodying the dual expansion ratio feature of this invention. Fuel and oxidizer is injected through injector 10 into combustion chamber 4. When combustion takes place in combustion chamber 4, the gases will pass through thorat combustion chamber 4, the gases will pass through throat area 12 in the conventional manner at sonic velocity and then accelerated in nozzle portion 6 and eventually exiting at exit plane 14 of nozzle portion 6. A second nozzle portion 8 is integral with or otherwise attached to exit plane 14 of nozzle portion 6. Nozzle portion 8 at attachment point 18 diverges from nozzle wall or portion 6 at an angle A as illustrated. In the example given, it has been found that this angle for optimum results is 26°. The angle for best results varies from 5 degrees to 30 degrees. The wall angle and contour will depend on the expansion areas selected for design. The contours, 6 and 8, must be carefully determined by supersonic flow calculations so that jet separation will occur at the discontinuity 18, and thrust performance at both areas 14 and 16 are not decreased significantly from an optimum design.

The expansion ratio of nozzle portion 6 is defined as the ratio of exit area 14 to the area of throat 12, and, in the given example is equal to 8. The expansion ratio of nozzle portion 8 is defined as the area of exit plane 16 to throat area 12 and, in the example given is equal to 25.

In operation, the bases after passing through throat area 12 accelerated and expand in nozzle portion 6 and exit through exit plane 14 at the lower altitudes, and eventually exit plane 16 at the higher altitudes. Due to the break at point 18 the expanding gases will not fill nozzle portion 8 due to high ambient pressure at lower altitudes. Upon reaching a pre-determined altitude, which, in the instant case approximates 20,000 feet, the ambient pressure will have decreased to the point where the expanding gases will "flip" at attachment point 18 and fill nozzle portion 8.

This phenomenon is illustrated in FIG. 2 which is a graph of the co-efficient of thrust versus altitude in feet. Without nozzle portion 8 and assuming the engine nozzle consisted only of portion 6 ending at exit plane 14, the coefficient of thrust would vary as shown by line 20 and dotted line 26. Likewise, assuming an expansion ratio of 25 without the change in diversion angle at 18, the graph would appear as line 22 and 32.

By arranging the structure as shown in FIG. 1 so that a break occurs at 18 and by providing a nozzle extension or separate portion 8 which extends at an angle to nozzle 6, a graph of coefficient of thrust versus altitude will result as shown in full line 20.

Although a drop in coefficient of thrust occurs at point 28 to point 30 at the moment of flipping to fill nozzle 8, this is more than made up for after point 24 by the increase above that altitude in the coefficient of thrust. This drop at point 28 represents approximately a 1 percent decrease in specific impulse at this altitude. Specific impulse is defined as the thrust produced in pounds divided by the mass flow rate in pounds per second and has a dimension of seconds. It is a commonly accepted definition of engine performance. It may be compared to gasoline mileage in an automobile. At approximately 30,000 feet, this decrease has dwindled to zero and with the greater thrust of the higher expansion ratio engine, a new result of an increase of specific impulse occurs. At the higher altitudes in the neighborhood of 120,000 feet and greater, the plots are substantially parallel since they are both asymptotic to the abscissa and this has been found by test to be slightly less than a 7 percent increase in specific impulse.

A major advantage of employing the dual epsilon or expansion ratio engine of this invention resides in the fact that the expanding gas undergoes a jet separation or flip such that vectoring due to progressive creep of the expanding gases is obviated.

Although this invention has been described with reference to set expansion ratios and with reference to only two area ratios, it is within the scope of this invention to provide more than two diverging nozzle portions and to utilize any desired expansion area ratios.

I claim:
1. A rocket engine comprising an injector, a combustion chamber, a throat section, a first diverging nozzle wall and a second diverging nozzle wall, said second nozzle wall diverging from said first nozzle wall at an acute angle of 26 degrees.

References Cited

UNITED STATES PATENTS

| | | | |
|---|---|---|---|
| 2,569,996 | 10/1951 | Kollsman | 239—265.11 |
| 3,126,702 | 3/1964 | Newcomb | 60—260 |
| 3,237,402 | 3/1966 | Steverding | 239—75 |

FOREIGN PATENTS

| | | |
|---|---|---|
| 897,568 | 11/1953 | Germany. |

CARLTON R. CROYLE, *Primary Examiner.*